United States Patent
Parle et al.

(10) Patent No.: US 8,707,177 B1
(45) Date of Patent: Apr. 22, 2014

(54) RESOURCE GUIDE GENERATOR FOR RESOURCE PAGES

(75) Inventors: Rory Parle, London (GB); Eoin Curran, Dublin (IE); John Curran, legal representative, Dublin (IE); Mitul Patel, Moorpark, CA (US); Peter B. Radmanesh, Mission Viejo, CA (US)

(73) Assignee: Google Inc., Mountain View, CA (US)

( * ) Notice: Subject to any disclaimer, the term of this patent is extended or adjusted under 35 U.S.C. 154(b) by 111 days.

(21) Appl. No.: 13/323,996

(22) Filed: Dec. 13, 2011

Related U.S. Application Data

(60) Provisional application No. 61/423,951, filed on Dec. 16, 2010.

(51) Int. Cl.
*G06F 17/00* (2006.01)
(52) U.S. Cl.
USPC ........... 715/705; 715/205; 715/708; 715/710; 715/711; 715/713; 715/715
(58) Field of Classification Search
USPC .......... 715/205, 708, 710, 711, 713, 715, 705
See application file for complete search history.

(56) References Cited

U.S. PATENT DOCUMENTS

2003/0221168 A1* 11/2003 Kozlov ......................... 715/513
2008/0216023 A1* 9/2008 Berglund et al. ............. 715/855

OTHER PUBLICATIONS

Heilmann, Christian. "Step by Step—Show and explain visitors what your page has for them," http://icant.co.uk/sandbox/stepbystep/ [retrieved online Dec. 16, 2010] Creative Commons 3.0 license. 15 pages.

Zheng, Long. "Windows Vista screencasts-istartedsomething," http://www.istartedsomething.com/20060613/windows-vista-screencasts/ [retrieved online Dec. 16, 2010] Jun. 13, 2006. 19 pages.

* cited by examiner

*Primary Examiner* — Doug Hutton, Jr
*Assistant Examiner* — Andrew McIntosh
(74) *Attorney, Agent, or Firm* — Armstrong Teasdale LLP

(57) ABSTRACT

Methods, systems, and apparatus, for generating in-situ resource guides. In one aspect, a method includes receiving flow elements for a resource, and for each flow element, identifying the respective resource instructions in the resource document that match a selector of the flow element; sequentially display flow interface elements, and for each sequentially displayed flow interface element: monitoring for the occurrence a user input of data in a user interface element corresponding to the selector of the flow element; and in response to monitoring the user input of data in a user interface element, sequentially displaying another flow interface element.

20 Claims, 6 Drawing Sheets

US 8,707,177 B1

RESOURCE GUIDE GENERATOR FOR RESOURCE PAGES

CROSS-REFERENCE TO RELATED APPLICATIONS

This application claims the benefit under 35 U.S.C. §119(e) of U.S. Patent Application No. 61/423,951, entitled "Resource Guide Generator," filed Dec. 16, 2010, which is incorporated herein by reference in its entirety.

BACKGROUND

This specification relates to resource guidance.

The Internet provides access to a wide variety of resources. Many of these resources are provided to facilitate various tasks, e.g., on-line banking tasks, blogging tasks, purchasing tasks, etc. Often a user must perform a workflow to complete the task. While some tasks are very simple, e.g., entering an e-mail address into a field, many tasks require multiple steps, and the workflow to perform the tasks may require the processing of several or more web pages. Because some users may be confused by the relative complexity of the workflow, publishers of the resources often provide "guided help" for a workflow.

Guided help is used to help users discover and try new features, as well as help them through long or complicated tasks. There are several schemes by which assistance is provided to users. Contextual help, for example, provides "tool tips" that appear within the pages of an application near potential areas of difficulty or confusion. However, contextual help is usually implemented as part of an application build, is typically only applicable to a particular context, and does not take into account an overall workflow context.

"Help center" documentation is another way to provide user assistance. Such documentation includes detailed article-style help information, usually in an organized or searchable database. These articles cover specific features or uses of the application, and individual topics may be linked to from within the relevant areas of the application itself or from within relevant tooltips. These articles are typically provide outside of a resource environment (e.g., as another web page or a separate application). A user must often navigate back and forth between steps, or print certain pages before returning to the application interface.

"Wizards" are another way to guide step-by-step processes. Wizards guide a user through a work flow by a series of dialogs with next/previous buttons. Wizards are often used to help new users set up an application, or to automate certain functionality for the most common case. Wizards, however, usually make changes on a user's behalf, and thus abstract away the actual experience within the application.

Yet another assistance paradigm is "beginner mode" in an environment. Beginner modes are a slightly (or drastically) different user interface that can be selected for a novice user. Beginner modes often hide advanced options and uncommon configuration options or functionality from the new user. A beginner mode is either toggled by the user or entered/exited automatically based on some criteria or heuristic. When the user switches from beginner to expert mode in an application, however, the user is faced with a new and unfamiliar interface.

Another assistance feature is provided by the use of scripts for web page resources. The scripts provide pop-up windows by certain user interface elements. The pop-up windows include explanatory text, and navigation features to a next pop-up window or a previous pop-up window. However, the scripts and associated data do not transition based on user inputs to the underlying resource, and thus a user must manually transition to the next window. This can be cumbersome and, for complex tasks, distracting. Furthermore, the generation of such scripts requires a relatively high proficiency in mark-up language programming and scripting, as the underlying resource for which the script is being prepared must be examined by an author for certain tags and identifiers.

SUMMARY

In general, an innovative aspect of the subject matter described in this specification can be embodied in methods that include the actions of accessing a resource document that causes a client device to render a resource page, the resource page including user interface elements, wherein each user interface element is defined by respective instructions in the resource document; receiving selections of user interface elements, and for each selected user interface element: determining one or more selectors, each selector being data defining a pattern match of the respective instructions in the resource document for the user interface element, and receiving an input that designates one of the selectors as a designated selector for the user interface element; generating, for each selected user interface element, a flow element, each flow element including: the designated selector that matches the respective instructions in the resource document for the user interface element, and display data that causes a client device to display a flow interface element corresponding to the user interface element defined by the respective instructions in the resource document that match the selector of the flow interface element; generating a script that accesses the flow elements generated for each of the set of user interface elements and that causes the client device to perform operations comprising: for each flow element, identifying the respective instructions in the resource document that match the designated selector of the flow element; sequentially display flow interface elements, and for each sequentially displayed flow interface element: monitoring for the occurrence of a transition condition; and in response to monitoring the occurrence of the transition condition, sequentially displaying another flow interface element. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing a resource document that causes a client device to render a resource page, the resource page including user interface elements, wherein each user interface element is defined by respective instructions in the resource document; receiving selections of user interface elements, and generating a flow element for each selected user interface element, each flow element including: a designated selector that defines a pattern match for the respective instructions in the resource document for the user interface element, display data that causes a client device to display a flow interface element corresponding to the user interface element defined by the respective instructions in the resource document that match the selector of the flow interface element, and transition data defining a transition between the flow element and another flow element, the transition being conditioned on the occurrence a user input of data in a user interface element of the resource page; generating a script that accesses the flow elements generated for each of the set of user interface elements and that causes the client device to perform operations comprising: for each flow element, identifying the respective instructions in the resource document that match the designated selector of the flow element; sequentially display flow interface elements, and for each sequentially displayed flow interface element: monitoring for the occurrence a user input of data in a user interface element corresponding to the selector of the flow element; and in response to monitoring the user input of data in a user interface element, sequentially displaying another flow interface element. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing a resource document; rendering a resource page including user interface elements, wherein each user interface element is defined by respective resource instructions in the resource document; in response to rendering the resource page, requesting from a server a flow resource for the resource page; receiving, in response to the request: a flow element for each of a set of user interface elements, each flow element including selector data defining a cascade style sheet selector that matches the respective instructions in the resource document for the user interface element, display data that causes the data processing apparatus to display a flow interface element corresponding to the user interface element defined by the respective instructions in the resource document that match the selector of the flow interface element, and transition data defining a transition between the flow element and another flow element, the transition being conditioned on the occurrence a user input of data in a user interface element of the resource page; a script that accesses the flow elements and causes the data processing apparatus to perform operations comprising: for each flow element, identifying the respective resource instructions in the resource document that match the selector of the flow element; sequentially display flow interface elements, and for each sequentially displayed flow interface element: monitoring for the occurrence a user input of data in a user interface element corresponding to the selector of the flow element; and in response to monitoring the user input of data in a user interface element, sequentially displaying another flow interface element. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Implementations of the subject matter provide a tasked-based help environment that provides more work flow context and structure than contextual help. Implementations of the subject matter provide detailed assistance in a sequential format within the application itself, as opposed to a series of steps and screenshots that must be printed and referred to before returning to the application. Additionally, implementations of the subject matter can teach simple tasks within the interface itself, as some implementations require a user input in the underlying interface before transitioning to the next step, thereby reinforcing the learning experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
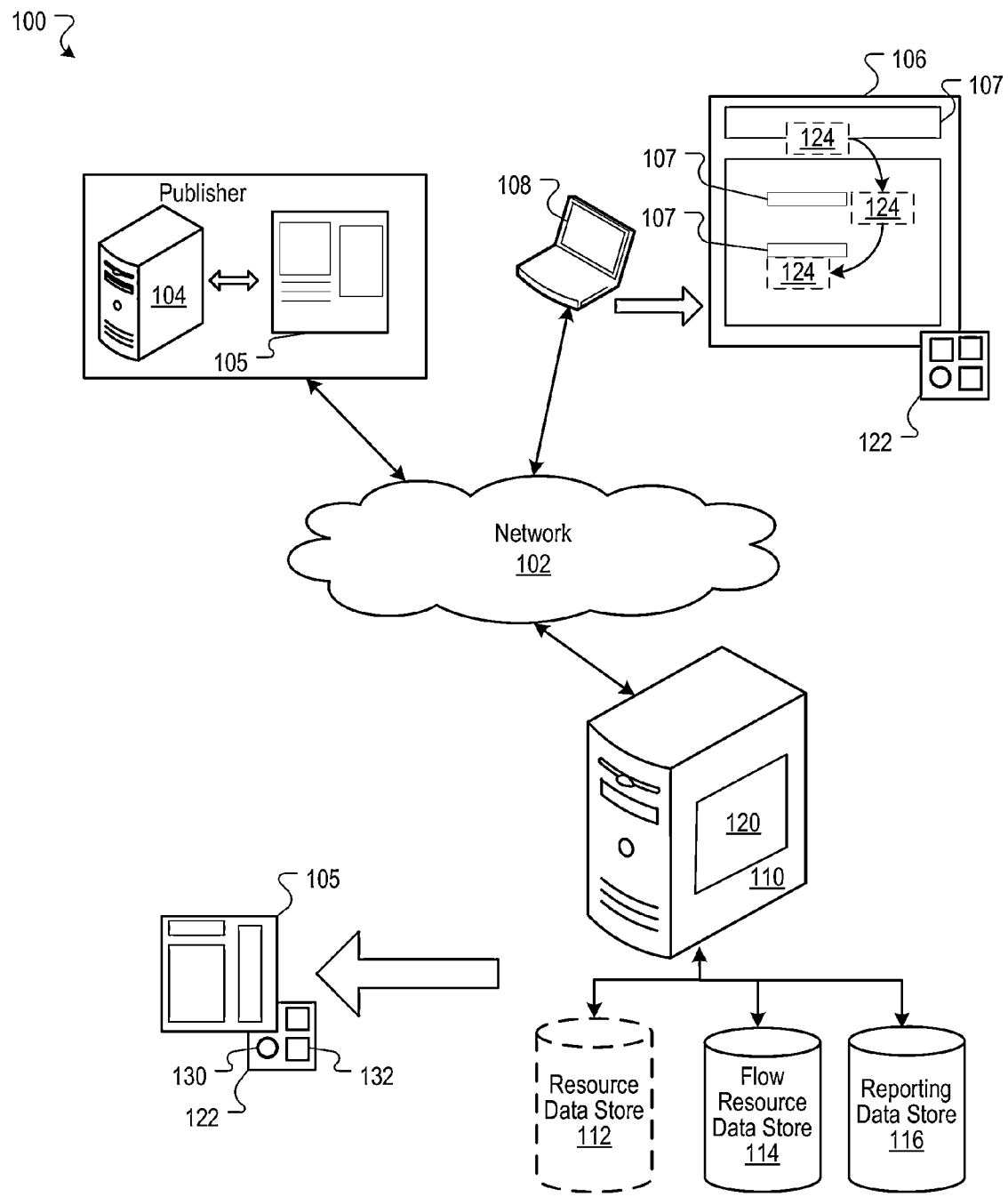
FIG. 1 is a block diagram of an environment in which a computer implementing a resource guide generator is used to generate and distribute in-situ resource guides.

FIG. 1 is a block diagram of an environment in which a computer implementing a resource guide generator is used to generate and distribute in-situ resource guides. A computer network 102, such as the Internet, or a combination of the Internet and one or more wired and wireless networks, connects publishers 104, a user device 108, and a resource guide system 110. Only one representative entity is respectively shown for the publishers 104 and user device 108. However, the online environment 100 connects many thousands of publishers and user devices.

The user device 108 is an electronic device that is under control of a user and is capable of requesting and receiving resources 105 over the network 102. Example user devices 108 include personal computers, mobile communication devices and other devices that can send and receive data over the network 102. A user device 108 typically includes a user application, such as a web browser or other communication software, to facilitate the sending and receiving of data over the network 102.

The publishers 104 maintain websites. Each publisher website is one or more resources 105 associated with a domain name, and each is hosted by one or more servers. A resource is any data that can be provided by the web site over the network 102 and that is associated with a resource address, e.g., a web page that includes hypertext mark-up language instructions. Each resource 105 is a document that stores instructions that can be processed by the client device 108. When instructions are processed by the client device, the instructions cause the client device to render the resource page 106. The resource page includes user interface elements 107. Example user interface elements include hyperlinks, text input fields, radio buttons, and the like.

Many of the resources 105 generate resource pages 106 that facilitate workflows for users. Many of these workflows can be quite complex. Accordingly, the publisher of the resource 105 can use a resource guide system 110 to generate a flow resource 122. When a publisher generates a resource guide in the form of flow resource 122, the publisher will typically map out a workflow for which guidance is needed. This involves selecting particular user interface elements 107 of a resource page 105 and providing information in a sequential manner for each of the selected user interface elements. The flow resource includes instructions and data that cause the client device to sequentially display flow interface elements 124 in various positions in the resource page 106, as indicated by the directional arrows linking the flow interface elements 124. The flow interface elements 124 display content that help users manage and learn the workflow. Additionally, as will be described in more detail below, the flow interface elements may be conditionally transitioned based on user input into the user interface elements 124. Accordingly, in some implementations, the user must take an active role in the workflow while being guided by the sequentially display of flow interface elements 124.

Each of the publishers is in data communication with the resource guide system 110. The resource guide system 110 includes software instructions 120 that generate a resource guide development environment in which users can generate flow resources 122 for particular resources. For example, the software instructions 120 may provide a bookmarklet to a user. A bookmarklet is an executable web browser bookmark that includes instructions for launching the resource guide development environment for a particular resource. Together the publishers 104 and the resource guide system 110 facilitate the provisioning of resources 105 with the corresponding flow resource 122.

In some implementations, the resource guide system 110 is maintained by an entity that is separate from the publisher. The publisher may access the resource guide system 110, provide its resources to the resource guide system 110, and generate flow resources 122, as will be described in more detail below. Alternatively, the resource guide system 110 can be maintained by a publisher for the publisher's own use.

The resource guide system 110 includes a resource data store 112, a flow resource data store 114, and a reporting data store 116. The resource data store 112 is shown in phantom, as the resources can be provided by the publishers if the resource guide system 110 is maintained by a separate entity. Alternatively, the resource guide system 110 may store copies of the publisher resources 104.

The flow resource data store 114 stores flow resources 122. In some implementations, the flow resource 122 includes a script 130 and flow elements 132. Each flow element 132 corresponds to a flow interface element 124. The script 130 defines instructions that cause a client device to process the flow elements 132 of the flow resource and display the corresponding flow interface elements 124.

Each flow element 132 includes a selector, i.e., data that defines a pattern match of the respective instructions in the resource document 105 for the user interface element 107. As will be described in more detail below, each user interface element 107 may have several associated instructions and may be uniquely referenced by several different types of data patterns. The resource guide system 110 can, in some implementations, determine multiple selectors for a particular user interface element, and allow a publisher to designate one of the selectors as the designated selector for the user interface element 124.

Each flow element 132 also includes display data that causes the client device 108 to display the flow interface element 124 that corresponds to the user interface element 107 defined by the respective instructions in the resource document 105 that match the selector for the flow interface element 124.

Additionally, in some implementations, each flow element 132 also includes transition data defining transitions between the flow element 132 and another flow element 132. These transitions, in turn, cause a client device to sequentially display the flow interface elements 124 on a display device. The transitions are conditioned on the occurrence of a transition condition. The transition condition can, for example, be the selection of the navigation command that is separate from the user interface element 107, or, alternatively, can be the user input of data for user interface element 107 corresponding to the flow interface element 124 of the flow element 132. Transition conditions are described in more detail below.

In some implementations, the selector is a cascade style sheet selector that defines a pattern that matches the markup language for the user interface element 107. The use of cascade style sheet selectors is described in more detail below. In variations of these implementations, the script is JavaScript, and the transition data, display data, and the selector for each flow element is stored in a JavaScript Object Notation (JSON) object. Other instruction sets and data structures can also be used.

In some implementations, the script 122 can also include instructions that cause the client device 108 to report user interactions that occur at the client device 108 when the flow interface elements 124 are displayed. This information can be stored in the reporting data store 116, and used by publishers to determine the efficacy of particular flow resources. For example, the publisher may receive complaints from users that a particular resource is difficult to navigate or difficult to understand. The publisher may design a resource guide for the resource 105, and publish the resource guide in the form of a flow resource 122. After implementing a particular flow resource 122 for a particular resource 105, the publisher can access the reporting data 116 to determine how many users are using the flow resource 122, and evaluate whether user complaints for the particular resource have decreased. If user complaints have decreased, then a reasonable inference is that use of the flow resource 122 is achieving the goal of reducing user complaints. Conversely, if user complaints have not decreased, or have increased, then a reasonable inference is that the use of the flow resource is not achieving the goal of reducing user complaints.

Other metrics can also be tracked by use of the reporting data. For example, page views, completions of a task, conversions, and navigations can all be tracked over time. The historical tracking data for the time prior to the use of the flow resource 122 can be compared to the historical tracking data for the time after the use of the flow resource 122 to evaluate whether the flow resource 122 is achieving the goals of the publisher.

To develop a flow resource 122, a publisher uses a resource guide development environment that the resource guide manager 110 provides.

Resource Guide Development

Figure 2:
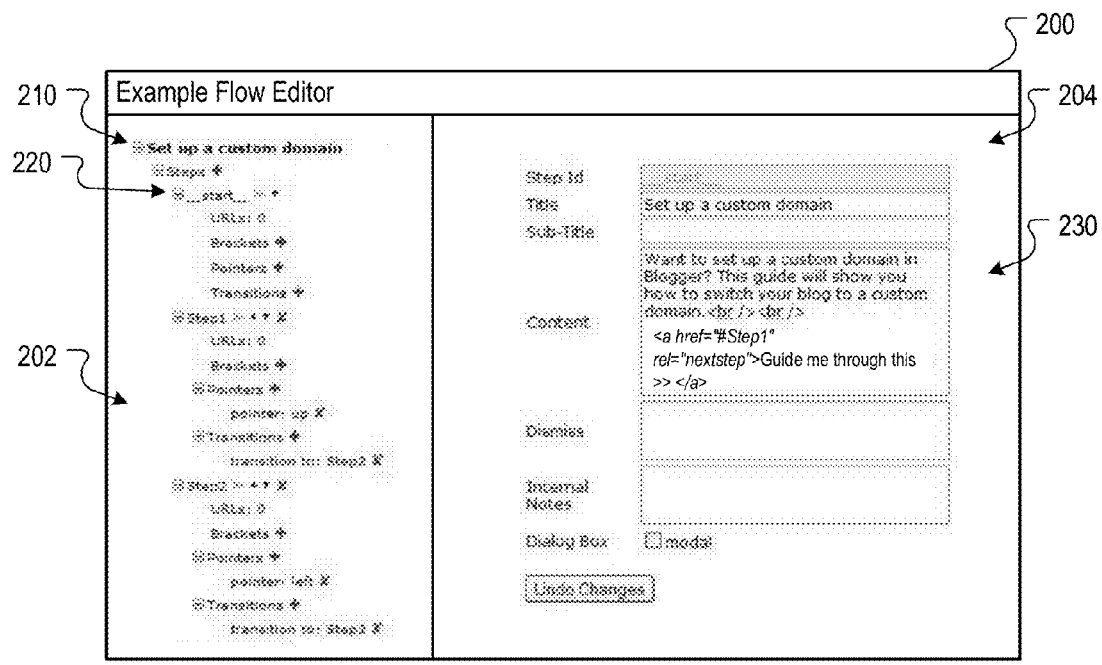
FIG. 2 is a screen shot of an example resource guide development environment.

FIG. 2 is a screen shot of an example resource guide development environment 200. The environment 200 includes a first frame 202 in a second frame 204. In the first frame 202, a resource flow outline 210 is displayed. The resource flow outline 210 includes step nodes 220 for each step for which they resource interface element 124 is provided. Each step node 220 corresponds to a particular flow element and includes child nodes for data that define the flow element 132.

The flow resource 122 begins with a step entitled "_start_", which represents the first step in the flow defined by the flow resource. A user defines additional steps through the resource guide development environment 200.

The second frame 204 includes user input fields 230 that are used to provide content and other data for a particular flow element. The Step Id is the unique name of the step, represented by a corresponding flow element, for the flow. The Title summarizes what step of the flow a user is currently performing, and appears in the flow interface element 124 that is displayed on the client device. The sub-title is an optional field can be used to display additional information.

The content defines the text and other data that appears in the flow interface element 124. Typically, the content describes what the user should do, and how the user should move on to the next step. The content can also include links to other steps, as illustrated by the link in the content field of FIG. 2. In some implementations, the content section stores arbitrary HTML.

Typically, a flow interface element 124 includes a default "dismiss" command link. The dismiss field can be used to override the default dismiss command, and can store HTML. For example, the default dismiss link could be <a class='g-help-dismiss-anchor' rel='nextstep' href='#_dismiss_'title='Dismiss the guide'>Dismiss</a>. A user could change the anchor text and/or provide a different link to either another step or another resource.

The Internal Notes are notes for the author. The notes are not rendered in the flow interface element 124.

The modal check box determines whether the flow interface element 124 is rendered in the form of a modal dialog box or in a default position (e.g., at the top of a display portion in a web page). A modal dialog box displays the content of the flow interface element 124 in a movable dialog box on the screen. When selected, a user is presented with an interface (not shown) to select one of the following four position attributes:

Centered—The default position will display the flow interface element 124 in the center of the screen.

Absolute—Absolute positioning will use "Left Offset" and "Top Offset" values that a user may specify to position the flow interface element 124 on the page. A default value (0px, 0px) is the upper left corner of the page.

Bracket—If the flow interface element 124 is rendered with a bracket highlight (described below), this option appears as a selection. Selection of the Bracket attribute causes the flow interface element 124 to appear adjacent to a bracket. In some implementations, the position with respect to the bracket can be further defined by the user (e.g., left, right, top, and bottom) to display the flow interface element 124 to the left, right, one the top or bottom of the bracket, respectively.

Element—This option allows the flow interface element 124 to be displayed next to a specific user interface element on a resource page 106. In some implementations, the user can specify the element by a CSS selector path, if known. If the CSS selector path is not known, the user can invoke a "discovery" process, described with reference to FIGS. 7 and 8 below, to identify candidate CSS selectors and select one of CSS selectors as a designated selector.

Figure 3:
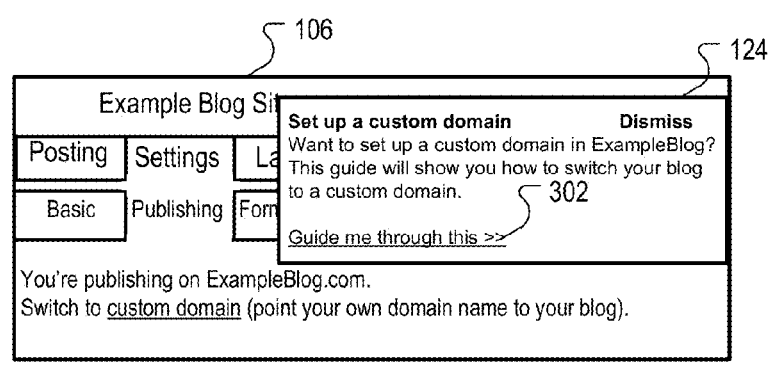
FIG. 3 is an illustration of a flow interface element displayed in a resource page.

FIG. 3 is an illustration of a flow interface element 124 displayed in a resource page 106. The flow interface element 124 corresponds to the flow element 132 that is generated from the data shown in the resource guide development environment 200 of FIG. 2.

The flow interface element 124 displays the content defined in the content field of the user input fields 230. Near the bottom of the flow interface element 124 is a link 302 that links to the next flow interface element 124, which is described with reference to FIGS. 4 and 5 below.

Figure 4:
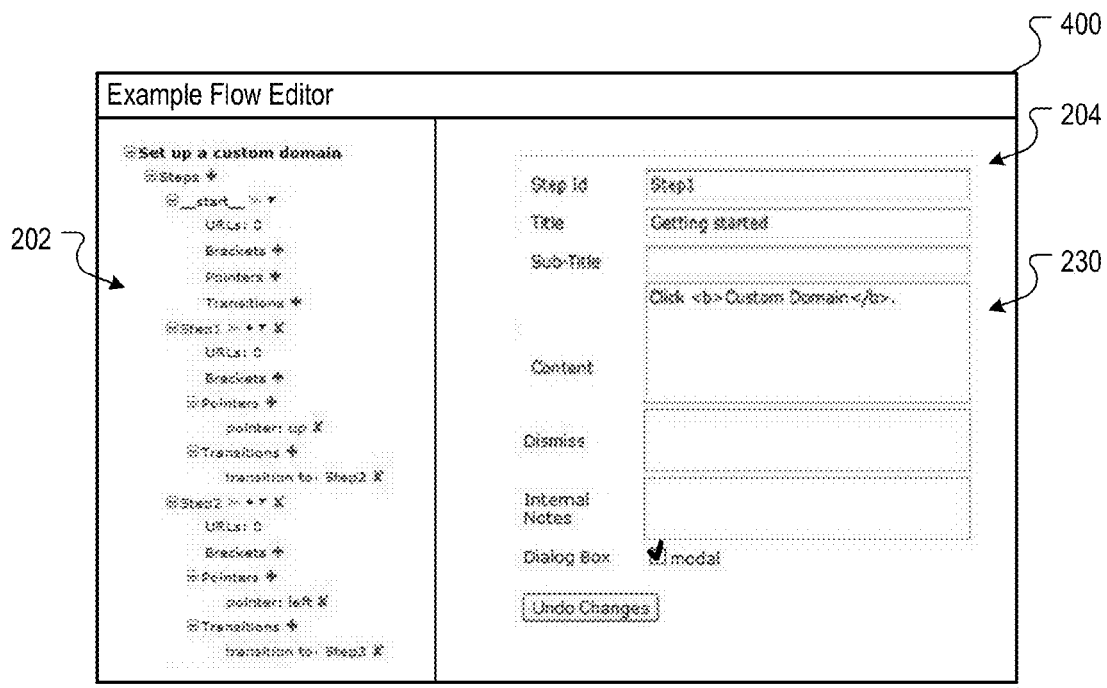
FIG. 4 is another screen shot of the resource guide development environment.
Figure 5:
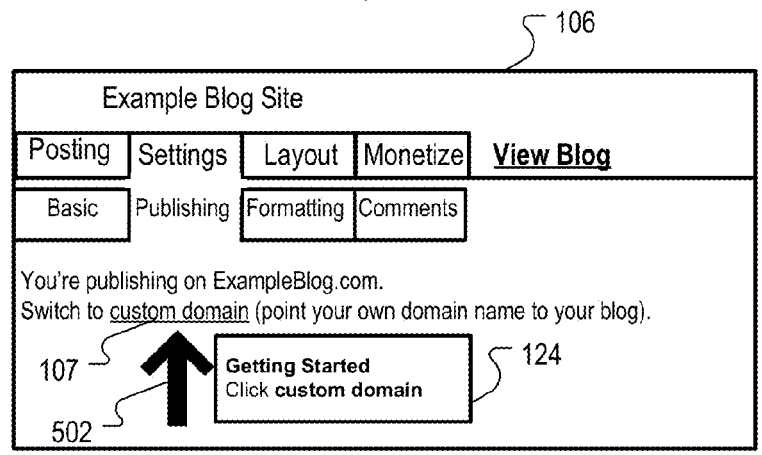
FIG. 5 is an illustration of another flow interface element displayed in the resource page.

FIG. 4 is another screen shot of the resource guide development environment 400. The resource guide development environment 400 is similar to the resource guide development environment 200 of FIG. 2. However, in the environment 400, the user input fields 230 store data for the flow interface element 124 that is displayed subsequent to the flow interface element 124 of FIG. 3. The subsequently displayed flow interface element 124 is shown in FIG. 5, which is an illustration of another flow interface element 124 displayed in the resource page 106. In environment 400, the modal dialog box is selected, and the user has selected the user interface element 107 "custom domain" as the user interface element for which the flow interface element 124 is to be proximately displayed. Additionally, the user has selected a highlight 502 that points to the particular user interface element selected.

The flow element 132 that is used to generate the flow interface element 124 of FIG. 5 includes transition data that defines a transition conditioned on the occurrence a user input of data for the user interface element of the resource page 106. In particular, the transition data defines a transition that occurs only when the user selects the hyperlink "custom domain." This requires the user to take an active step of selecting a link within the resource page 106 to progress through the flow. Thus, unlike transition data for the flow interface element 124 displayed in FIG. 3, which required a selection of the navigation command (link 302) within the flow interface element 124, the transition data for the flow interface element 124 of FIG. 5 requires the user to interact with the resource page 106 to progress through the flow.

Figure 6:
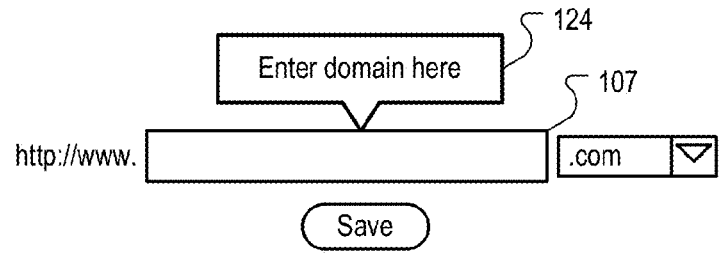
FIG. 6 is an illustration of another flow interface element displayed adjacent to a user interface element.

FIG. 6 is an illustration of another flow interface element 124 displayed adjacent to a user interface element 107. The flow interface element 124 of FIG. 6 is displayed subsequent to the flow interface element 124 of FIG. 5, and in response to selecting the "custom domain" user interface element 107. Once again, the transition data require the user to input data to the user interface element 107 to progress through the flow.

Each of the flow interface elements 124 of FIGS. 3, 5 and 6 have different highlight features. In particular, the flow interface element 124 of FIG. 3 does not include a highlight element; the flow interface element 124 of FIG. 5 includes an arrow highlight element; and the flow interface element 124 of FIG. 6 includes a caption highlight element. For each flow interface element 124, the user can define a corresponding highlight element. Typically, highlight elements are selected to highlight the user interface element 107 that the flow interface element 124 corresponds to.

Two example highlight elements are brackets and pointers. A bracket highlight element is often used when a large user interface element 107 needs to be highlighted. For example, a group of form fields or other input fields can be highlighted with a bracket. The pointer highlight element is often used to point to a particular user interface element. Both the bracket highlight element and the pointer highlight element are associated with positioning attributes similar to those described above, e.g., left, right, top and bottom.

As described above, highlight elements and the position of the flow interface element 124 can be made dependent on the position of the user interface element 107 for which information and guidance is being provided for a particular step in the flow. The underlying flow element 132 that the client device 108 uses to render the flow interface element 124 includes a selector to select a particular user interface element 107. In some implementations, the selector is data defining a pattern match of the respective instructions in the resource document for the user interface element. For example, cascade style sheets selectors can be used as selectors.

Discovery of Selectors

The resource guide manager 110 can, in some implementations, discover one of more selectors for a particular user interface element. The user authoring a particular flow may then select one of the selectors for the flow element 132. This can be done by invoking a discovery mode in the development environment.

Figure 7:
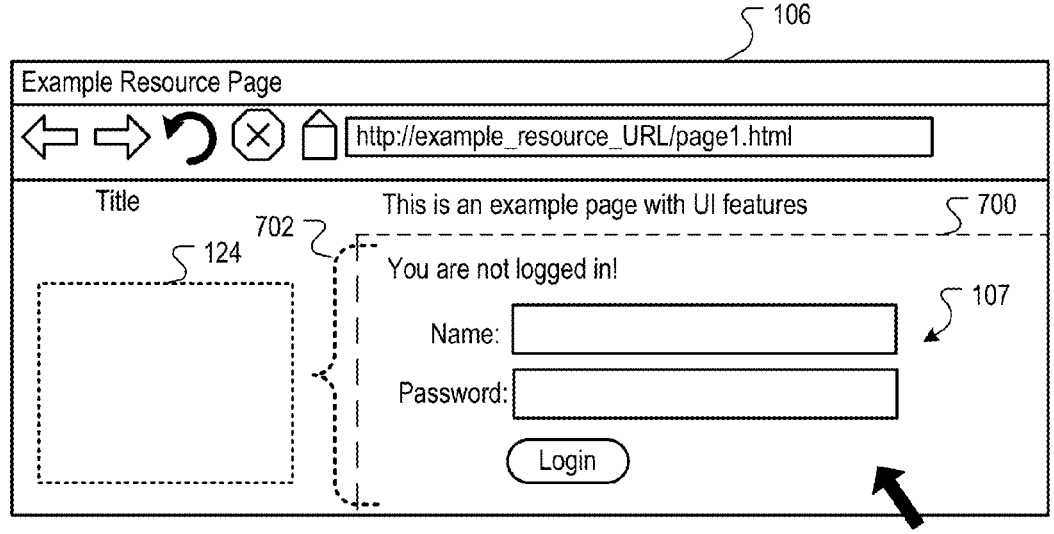
FIG. 7 is an illustration of a resource page undergoing processing in a discovery mode.

FIG. 7 is an illustration of a resource page undergoing processing in a discovery mode. During the discovery mode, the user positions the cursor over a particular user interface element of interest. As the cursor is positioned over an interface element 107, the resource guide system 110, executing instructions 120, cause the user interface element 107 to be highlighted, as indicated by the highlight outline 700. In some implementations, the portions of the flow interface element 124 that are currently defined can also be displayed in phantom form. For example, as shown in FIG. 7, the position of the flow interface element 124 and a corresponding bracket highlight 702 are displayed. The user can select the user interface element by invoking a keyboard command, e.g., by pressing the shift key while the cursor is hovered over the user interface element. In response to the selection, the resource guide system 110 processes the underlying instructions of the resource document 105 that are used to generate the user interface element 107 and generates selectors that pattern match the instructions.

For example, the following instructions in a resource document 105 are used to generate the user interface element 107 of FIG. 7:

<form id="login">
    <div><label>Name: <input name="u">v</div>
    <div><label>Password:    <input    name="p?
        type="password"></label></div>
    <div class="red">
        <input id="log-in" type="submit" value="Log in">
    </div>
    </form>

The resource guide system 110, identifies the following selectors that identify the "Login" button:

div.red input
    form#login input[type='submit']
    #log-in

Figure 8:
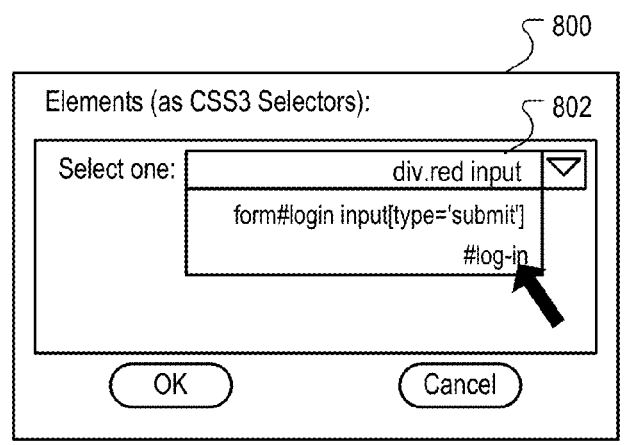
FIG. 8 is an illustration of a resource guide selector interface.

The three selectors are displayed in FIG. 8, which is an illustration of a resource guide selector interface 800. The interface 800 is invoked in response to the user selecting the interface element 107. Given the three selector options, the user must select one of the selectors as a designated selector, or otherwise accept a default selector (e.g., div.red input).

When selecting a selector, the user should choose a selector that is likely to be the most robust with respect to format changes and resource document changes. For example, a resource document 105 may be slightly modified, e.g., the position of a particular UI element may be changed, or the background color of the particular UI element may be changed.

In the example of FIG. 8, the most robust selector is the "#log-in" selector. With respect to the selector "div.red input", the "red" class is a subjective coloring used for styling and is more susceptible to change than is the "log-in" identifier. While the "form#login input[type='submit']" selection is likely more robust than the "div.red input" selector, the presence of a "submit" button is very common. Accordingly, if another form that includes a "submit" button is added to the page, the flow interface element 124 may be rendered in the incorrect location. Because the selector "#log-in" is likely to be a unique name used on the resource page, it is likely the most robust selector.

In some implementations, the identified selectors can be ranked according to an algorithm that determines a score for each of the selectors. Selectors that are based on stylistic formatting e.g., coloring, font styles, etc., are scored lower than selectors that are based on descriptive terms, e.g., "Login", "Submit", etc. Likewise, selectors that are based on descriptive terms are ranked lower than selectors that name a markup language structure, e.g., a unique table name, etc.

Transitions

Figure 9:
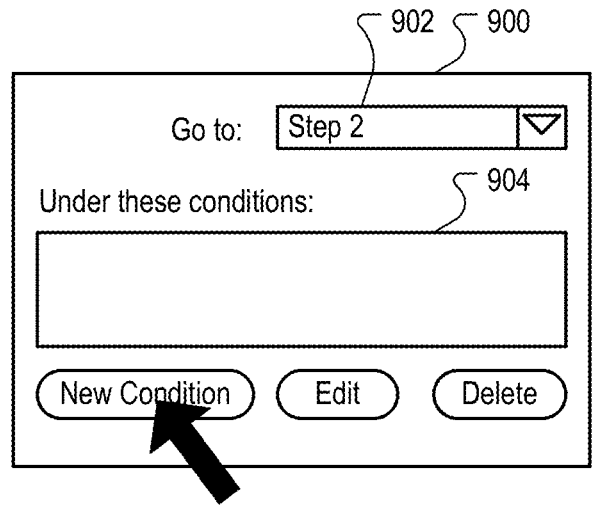
FIGS. 9 and 10 are illustrations of a resource guide transition interface.
Figure 10:
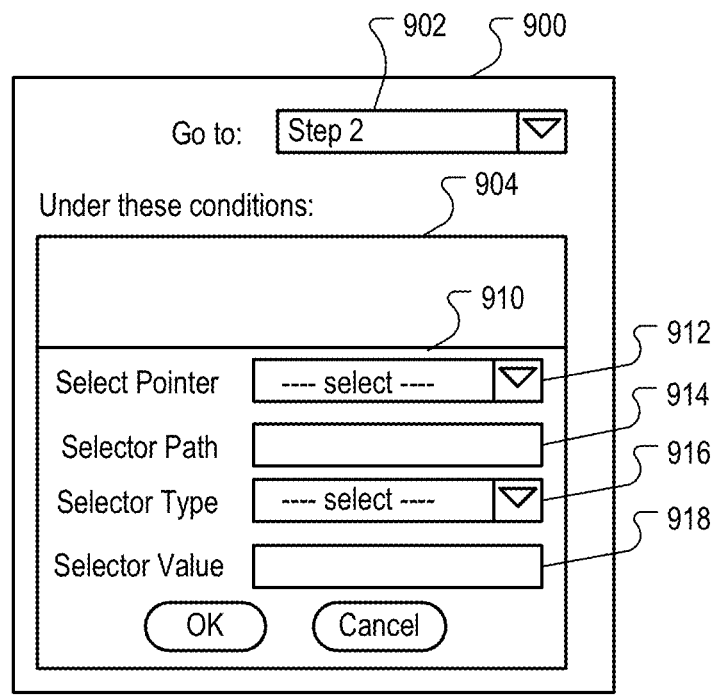

As described above, a transition condition can be a condition that is internal to a flow interface element (e.g., a navigation command link displayed in the flow interface element, a time out, etc.) or can be a condition that is internal to the resource page (e.g., selection of a user interface element displayed on a resource page 106, or otherwise providing an input to a user interface element). In some implementations, selection of a transition condition is accomplished through the use of a resource guide transition interface 900, which is shown in FIGS. 9 and 10. In the interface 900, the user selects the next sequential flow element by using the pull-down menu 902. With the next sequential flow element is selected, the user then selects a "New Condition" button to invoke a condition selection menu 910. The condition selection menu 910 includes a select pointer input 912, a selector path input 914, a selector type input 916, and a selector value input 918. One or more these input fields can be used to declare a condition.

The select pointer input 912 is a condition that is associated with the chosen user interface element 107 associated with the flow step. For example, if the flow element causes an "OK" button in a step to be highlighted, and this user interface element 107 is selected as the condition, then the transition condition occurs when a user clicks the button.

The selector path input 914 is used to condition off a user interface element 107 that has not been previously selected. The selector path can be input directly, or alternatively can be selected by use of the discovery process similar to the discovery process described above.

The selector type input 916 is used to choose an action that a user needs to take on the highlighted user interface element 107 for the transition condition to occur. For example, if a link or button user interface element is highlighted, the selector type "click" may be selected.

Table 1 below lists example selector types.

TABLE 1

| Selector Types | |
|---|---|
| change | value of the input field changes |
| click | element is clicked upon |
| focusIn | element gains focus |
| focusOut | element loses focus |
| keyPress | key is pressed while focus is on the element |
| mouseOver | mouse pointer moves over the element |
| mouseOut | mouse pointer moves off of the element |
| submit | form is submitted |
| url | URL of the current page matches the specified regular expression |
| notUrl | URL of the current page does not match the specified regular expression |
| visible | element is visible |
| notVisible | element does not exist or is not visible |
| enabled | element is enabled |
| disabled | element is disabled (grayed out) |
| checked | checkbox or radio button is checked/selected |
| notChecked | checkbox or radio button is not checked |
| hasChildren | element has child nodes |
| noChildren | element does not have any child nodes |
| equals | value of the element equals the specified value |
| notEquals | value of the element does not equal the specified value |
| lessThan | value of the input field is less than the specified value |
| greaterThan | value of the input field is greater than the specified value |
| lessOrEqual | value of the input field is less than or equal to the specified value |
| greaterOrEqual | value of the input field is greater than or equal to the specified value |

TABLE 1-continued

Selector Types

| | |
|---|---|
| regExp | value of the element matches the specified regular expression value |
| notRegExp | value of the element does not match the specified regular expression value |

The selector value input 918 is used depending on the selector type input 916 that is chosen. For example, if the transition is condition on the selection of a radio button, the selector value may be set to "Yes"

Valid URLs and Multi-Page Flows

In some implementations, a flow resource can be associated with valid URLs. Valid URLs can be assigned for the entire flow, and for individual steps. The flow resource 122 can be configured to execute only on URLs that are designated as valid URLs. In some implementations, the valid URLs can be entered as regular expressions so that partial URLs will satisfy a valid URL (e.g., #home, google.com, etc.).

The use of valid URLs precludes the flow resource 122 from executing on resource documents 105 for which the flow resource 122 was not designed. For example, if a user is in the middle of a flow, and decides to navigate away from the page (e.g., clicking a link on the page, clicking the back button, or entering a URL), and the new page has an address that is not a valid URL, the flow resource will not execute.

When a flow is designed for two resources 105, the flow resources 122 can set cookies that can store data indicating the state of the flow. This can be especially useful when the flow has multiple navigation opportunities between two or more pages, as the state can be persisted in the cookies. Accordingly, when a new flow resource 122 is instantiated for a new resource document 105, the script 130 of the flow resource checks for any cookies that are relevant to the flow and sets the state of the flow for the resource page 106 accordingly.

Example Processes

Figure 11:
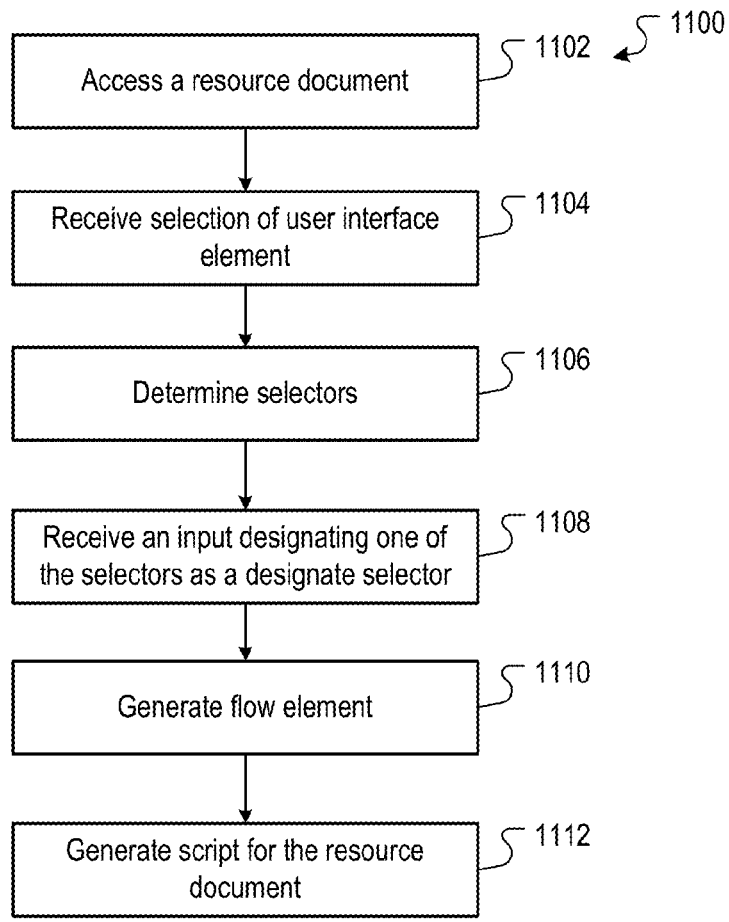
FIG. 11 is a flow diagram of an example process for generating a resource guide.

FIG. 11 is a flow diagram of an example process 1100 for generating a resource guide. The process 1100 can be implemented in the resource guide system 110.

The process 1100 accesses a resource document (1102). For example, the resource guide system 110 accesses a resource document that causes a client device to render a resource page. The resource page includes user interface elements, and each user interface element is defined by respective instructions in the resource document.

The process 1100 receives selections of user interface elements (1104), and for each selected user interface element, the process 1100 determines selectors for the selected user interface element (1106). For example, the resource guide system 110 can use the discovery process described above to identify selectors for selected user interface elements.

The process 1100 receives an input designating one of the selectors as a designated selector (1108). For example, the resource guide system 110 can receive a user selection of one of several cascade style sheets selectors that are generated for user interface element.

The process 1100 generates a flow element (1110). For example, the resource guide system 110 can generate flow elements that include the designated selector that matches the respective instructions in the resource document for the user interface element and display data that causes a client device to display a flow interface element corresponding to the user interface element defined by the respective instructions in the resource document that match the selector of the flow interface element.

The process 1100 generates a script for the resource document (1112). For example, the resource guide system 110 generates a script that accesses the flow elements generated for each of the set of user interface elements. The script causes the client device to identify the respective instructions in the resource document that match the designated selectors of the flow elements, and sequentially display flow interface elements.

Figure 12:
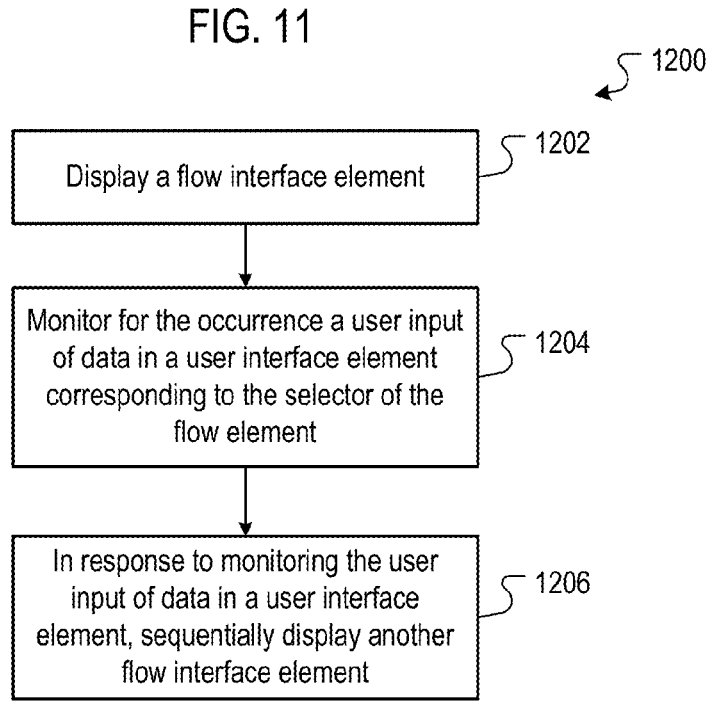
FIG. 12 is a flow diagram of an example process of sequentially displaying flow interface elements.

FIG. 12 is a flow diagram of an example process 1200 of sequentially displaying flow interface elements. The process 1200 can be implemented in the client device.

Process 1200 displays a flow interface element (1202). For example, a client device executing the script of the flow resource 122 will display a flow interface element 124. The flow interface element 124 corresponds to a flow element 132.

The process 1200 monitors for the occurrence of user input of data in the user interface element corresponding to the selector of the flow element (1204). For example, client device executing the script monitors for the occurrence of the user input of data as defined by the transition data of the flow element 132.

In response to monitoring the user input of data in the user interface element, the process 1200 sequentially displays another flow interface element (1206). For example, the process 1200 will transition to the next flow element 132 in a flow order, which causes the client device to render the next flow interface element.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A system, comprising:
a data processing apparatus including a processor; and
a data storage apparatus encoded with instructions that when executed by said data processing apparatus cause the data processing apparatus to perform operations comprising:
accessing a resource document that causes a client device to render a resource page, the resource page including user interface elements, wherein each user interface element is defined by respective instructions in the resource document;
generating, for each of a set of user interface elements, a flow element, each flow element including:
selector data defining a selector that matches the respective instructions in the resource document for the user interface element;

display data that causes a client device to display a flow interface element corresponding to the user interface element defined by the respective instructions in the resource document that match the selector of the flow interface element;

generating a script that accesses the flow elements generated for each of the selected user interface elements and that causes the client device to perform operations comprising:

for each flow element, identifying the respective instructions in the resource document that match the selector of the flow element;

displaying flow interface elements, and for the displaying of at least one flow interface element:

monitoring for the occurrence of a transition condition; and in response to monitoring the occurrence of the transition condition, displaying another flow interface element.

2. The system of claim 1, wherein the instructions cause the data processing apparatus to perform further operations comprising:

receiving selections of the user interface elements, and for each selected user interface element:

determining one or more of the selectors, each selector being data defining a pattern match of the respective instructions in the resource document for the user interface element; and receiving an input that designates one of the selectors as a designated selector for the user interface element.

3. The system of claim 1, wherein:

each flow element further includes transition data defining a transition between the flow element and another flow element, the transition being conditioned on the occurrence of the transition condition; and monitoring for the occurrence of a transition condition comprises monitoring for the occurrence of the transition condition defined by the transition data of the respective flow element; and displaying another flow interface element comprises sequentially displaying the flow interface element for the another flow element for which the transition is defined.

4. The system of claim 3, wherein:

at least one flow interface element includes a navigation command that is separate from the user interface element; and the transition condition for the flow interface element is a user selection of the navigation command.

5. The system of claim 3, wherein the transition condition for the flow interface element is a user input of data for a user interface element corresponding to the flow interface element.

6. The system of claim 3, wherein the transition condition for the flow interface element is a user selection of a hyperlink included in the resource page, wherein selection of the hyperlink causes the client device to access another resource document that causes the client device to render another resource page.

7. The system of claim 1, wherein:

the resource document is a mark-up language document; and for each flow element, the defined selector is a cascade style sheet selector that defines a pattern that matches the mark up language for the user interface element.

8. The system of claim 3, wherein the instructions cause the data processing apparatus to perform further operations comprising:

generating, for each flow element, content text, the context text being text that is displayed with the flow interface element;

store the context text for each flow element in a mark-up language format; and store the transition data, display data and the defined selector for each flow element as a JavaScript Object Notation (JSON) object.

9. The system of claim 3, wherein:

the resource document is a mark-up language document;

for each flow element, the defined selector is a cascade style sheet selector that defines a pattern that matches the mark-up language for the user interface element; and the instructions cause the data processing apparatus to perform further operations comprising:

providing, in response to a request from a client device that is processing the resource document, the script and the flow elements to the client device.

10. The system of claim 9, wherein:

the script causes the client device to perform the operation of providing to the data processing apparatus reporting data that describes user interactions that occur at the client device when the flow interface elements are displayed; and the instructions cause the data processing apparatus to perform further operations comprising storing the reporting data received from the client device.

11. A system, comprising:

a data processing apparatus including a processor; and a data storage apparatus encoded with instructions that when executed by said data processing apparatus cause the data processing apparatus to perform operations comprising:

accessing a resource document that causes a client device to render a resource page, the resource page including user interface elements, wherein each user interface element is defined by respective instructions in the resource document;

receiving selections of user interface elements, and generating a flow element for each selected user interface element, each flow element including:

a designated selector that defines a pattern match for the respective instructions in the resource document for the user interface element;

display data that causes a client device to display a flow interface element corresponding to the user interface element defined by the respective instructions in the resource document that match the selector of the flow interface element; and transition data defining a transition between the flow element and another flow element, the transition being conditioned on the occurrence a user input of data in a user interface element of the resource page;

generating a script that accesses the flow elements generated for each of the selected user interface elements and that causes the client device to perform operations comprising:

for each flow element, identifying the respective instructions in the resource document that match the designated selector of the flow element;

displaying flow interface elements, and for each displayed flow interface element:

monitoring for the occurrence of a user input of data in a user interface element corresponding to the selector of the flow element; and in response to monitoring the user input of data in a user interface element, displaying another flow interface element.

12. The system of claim 11, wherein the instructions cause the data processing apparatus to:

display the flow interface elements by sequentially displaying the flow interface elements.

13. The system of claim 11, wherein:

the resource document is a mark-up language document; and for each flow element, the selector defines a pattern that matches the mark-up language for the user interface element.

14. The system of claim 11, wherein:

each flow element includes context text in a mark-up language format that is displayed with the flow interface element; and the transition data, display data and selector data for each flow element are stored as a JavaScript Object Notation (JSON) object.

15. A method performed by a data processing apparatus, comprising:

accessing a resource document that cause a client device to render a resource page, the resource page including user interface elements, wherein each user interface element is defined by respective instructions in the resource document;

receiving selections of user interface elements, and for each selected user interface element:

determining one or more selectors, each selector being data defining a pattern match of the respective instructions in the resource document for the user interface element; and receiving an input that designates one of the selectors as a designated selector for the user interface element;

generating, for each selected user interface element, a flow element, each flow element including:

the designated selector that matches the respective instructions in the resource document for the user interface element; and display data that causes a client device to display a flow interface element corresponding to the user interface element defined by the respective instructions in the resource document that match the selector of the flow interface element;

generating a script that accesses the flow elements generated for each of the selected user interface elements and that causes the client device to perform operations comprising:

for each flow element, identifying the respective instructions in the resource document that match the designated selector of the flow element;

sequentially display flow interface elements, and for each sequentially displayed flow interface element:

monitoring for the occurrence of a transition condition; and in response to monitoring the occurrence of the transition condition, sequentially displaying another flow interface element.

16. The method of claim 15, wherein:

each flow element further includes transition data defining a transition between the flow element and another flow element, the transition being conditioned on the occurrence of the transition condition; and monitoring for the occurrence of a transition condition comprises monitoring for the occurrence of the transition condition defined by the transition data of the respective flow element;

sequentially displaying another flow interface element comprises sequentially displaying the flow interface element for the another flow element for which the transition is defined;

the resource document is a mark-up language document; and for each flow element, the selector is a cascade style sheet selector that defines a pattern that matches the mark-up language for the user interface element.

17. A method performed by a data processing apparatus, comprising:

accessing a resource document that causes a client device to render a resource page, the resource page including user interface elements, wherein each user interface element is defined by respective instructions in the resource document;

receiving selections of user interface elements, and generating a flow element for each selected user interface element, each flow element including:

a designated selector that defines a pattern match for the respective instructions in the resource document for the user interface element;

display data that causes a client device to display a flow interface element corresponding to the user interface element defined by the respective instructions in the resource document that match the selector of the flow interface element; and transition data defining a transition between the flow element and another flow element, the transition being conditioned on the occurrence a user input of data in a user interface element of the resource page;

generating a script that accesses the flow elements generated for each of the selected user interface elements and that causes the client device to perform operations comprising:

for each flow element, identifying the respective instructions in the resource document that match the designated selector of the flow element;

sequentially display flow interface elements, and for each sequentially displayed flow interface element:

monitoring for the occurrence a user input of data in a user interface element corresponding to the selector of the flow element; and in response to monitoring the user input of data in a user interface element, sequentially displaying another flow interface element.

18. A non-transitory computer-readable medium storing instructions that when executed by a data processing apparatus cause the data processing apparatus to perform operations comprising:

accessing a resource document that cause a client device to render a resource page, the resource page including user interface elements, wherein each user interface element is defined by respective instructions in the resource document;

generating, for each of a set of user interface elements, a flow element, each flow element including:

selector data defining a selector that matches the respective instructions in the resource document for the user interface element; and display data that causes a client device to display a flow interface element corresponding to the user interface element defined by the respective instructions in the resource document that match the selector of the flow interface element;

generating a script that accesses the flow elements generated for each of the set of user interface elements and that causes the client device to perform operations comprising:

for each flow element, identifying the respective instructions in the resource document that match the selector of the flow element;

sequentially display flow interface elements, and for each sequentially displayed flow interface element:

monitoring for the occurrence of a transition condition; and in response to monitoring the occurrence of the transition condition, sequentially displaying another flow interface element.

19. A non-transitory computer-readable medium storing instructions that when executed by a data processing apparatus cause the data processing apparatus to perform operations comprising:

accessing a resource document that causes a client device to render a resource page, the resource page including user interface elements, wherein each user interface element is defined by respective instructions in the resource document;

receiving selections of user interface elements, and generating a flow element for each selected user interface element, each flow element including:

a designated selector that defines a pattern match for the respective instructions in the resource document for the user interface element;

display data that causes a client device to display a flow interface element corresponding to the user interface element defined by the respective instructions in the resource document that match the selector of the flow interface element; and transition data defining a transition between the flow element and another flow element, the transition being conditioned on the occurrence a user input of data in a user interface element of the resource page;

generating a script that accesses the flow elements generated for each of the selected user interface elements and that causes the client device to perform operations comprising:

for each flow element, identifying the respective instructions in the resource document that match the designated selector of the flow element;

sequentially display flow interface elements, and for each sequentially displayed flow interface element:

monitoring for the occurrence a user input of data in a user interface element corresponding to the selector of the flow element; and in response to monitoring the user input of data in a user interface element, sequentially displaying another flow interface element.

20. A system, comprising:

a data processing apparatus including a processor; and a data storage apparatus encoded with instructions that when executed by data processing apparatus cause the data processing apparatus to perform operations comprising:

accessing a resource document;

rendering a resource page including user interface elements, wherein each user interface element is defined by respective resource instructions in the resource document;

in response to rendering the resource page, requesting from a server a flow resource for the resource page;

receiving, in response to the request:

a flow element for each of a set of user interface elements, each flow element including selector data defining a cascade style sheet selector that matches the respective instructions in the resource document for the user interface element, display data that causes the data processing apparatus to display a flow interface element corresponding to the user interface element defined by the respective instructions in the resource document that match the selector of the flow interface element, and transition data defining a transition between the flow element and another flow element, the transition being conditioned on the occurrence a user input of data in a user interface element of the resource page;

a script that accesses the flow elements and causes the data processing apparatus to perform operations comprising:

for each flow element, identifying the respective resource instructions in the resource document that match the selector of the flow element;

sequentially display flow interface elements, and for each sequentially displayed flow interface element:

monitoring for the occurrence a user input of data in a user interface element corresponding to the selector of the flow element; and in response to monitoring the user input of data in a user interface element, sequentially displaying another flow interface element.

* * * * *